US005537111A

United States Patent [19]
Martin et al.

[11] Patent Number: 5,537,111
[45] Date of Patent: Jul. 16, 1996

[54] SOLAR POWERED AIRCRAFT WARNING DEVICE

[76] Inventors: John S. Martin, 15 Woodland Ct.; John H. Hapgood, 15 Forest Hill Dr., both of Daleville, Ala. 36322; Clarence Rash, 110 Victoria Dr., Enterprise, Ala. 36330; Parley P. Johnson, 14 Seminole Ave., Lockhart, Ala. 36455

[21] Appl. No.: 152,638

[22] Filed: Oct. 25, 1993

[51] Int. Cl.⁶ .................................................. G08G 5/00
[52] U.S. Cl. ........................... 340/983; 340/981; 315/344
[58] Field of Search ........................... 340/983, 981, 340/982, 908.1, 555, 556, 567, 693, 636; 315/344; 362/183

[56] References Cited

U.S. PATENT DOCUMENTS

| | | | |
|---|---|---|---|
| 3,006,251 | 10/1961 | Wells | 340/981 |
| 4,759,735 | 7/1988 | Pagnol et al. | 340/982 |
| 4,772,990 | 9/1988 | Linehan et al. | 362/183 |
| 4,841,278 | 6/1989 | Tezuka et al. | 340/908.1 |
| 4,884,017 | 11/1989 | Williams | 340/908.1 |
| 5,001,402 | 3/1991 | Milton et al. | 315/344 |
| 5,027,294 | 6/1991 | Fakruddin et al. | 340/636 |
| 5,252,893 | 10/1993 | Chacham et al. | 340/908.1 |

*Primary Examiner*—John K. Peng
*Assistant Examiner*—Benjamin C. Lee
*Attorney, Agent, or Firm*—William Randolph; Anthony T. Lane; John F. Moran

[57] ABSTRACT

A solar-powered, illuminated aircraft warning marker for connection to suspended cables and overhead transmission lines includes a polygonal housing having a plurality of light elements attached to different sides of the housing. The warning marker includes solar cells, storage batteries and electrical circuit apparatus for selectively illuminating the light elements during low ambient light and nighttime conditions.

9 Claims, 5 Drawing Sheets

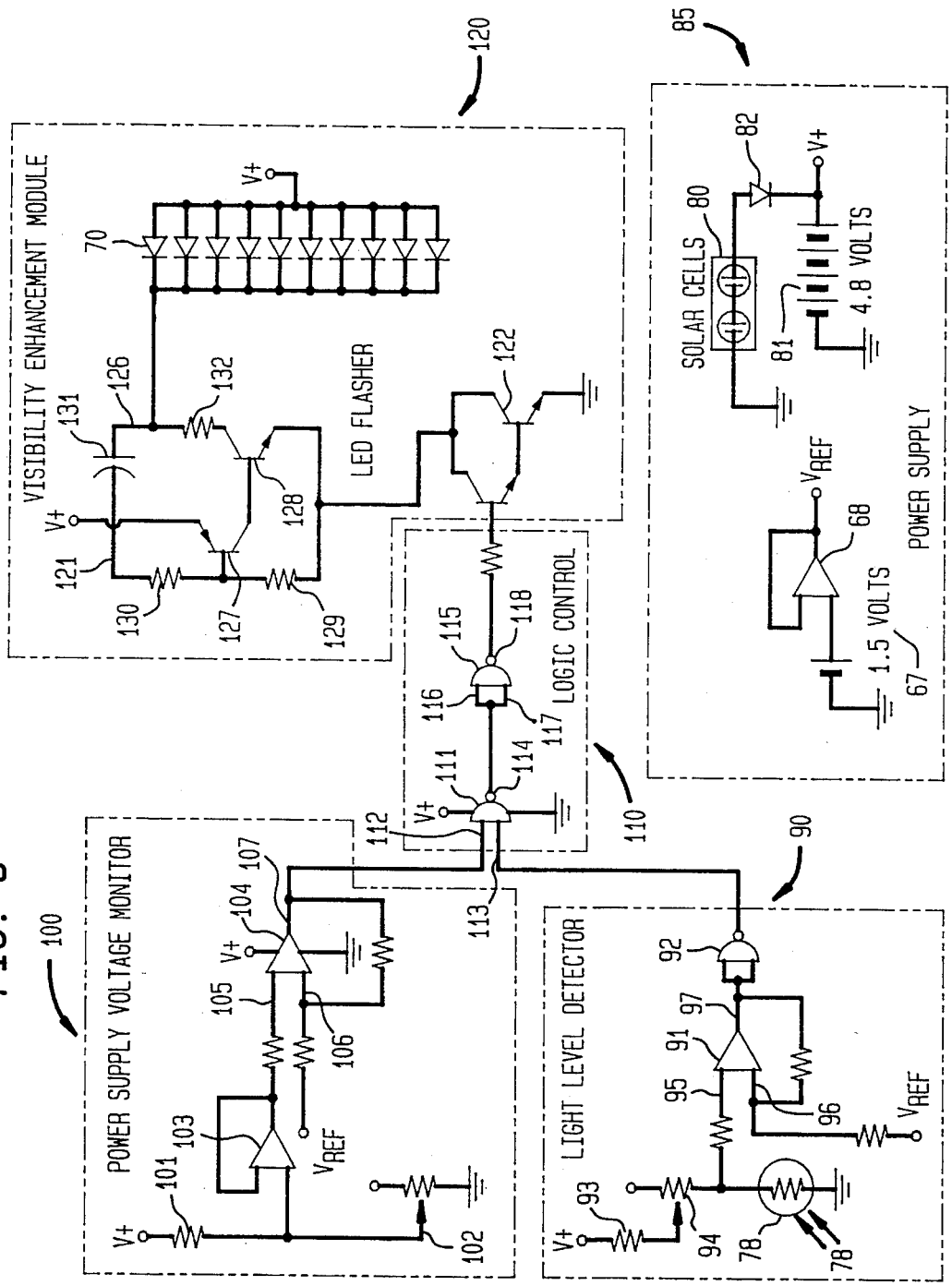

SOLAR POWERED AIRCRAFT WARNING DEVICE

BACKGROUND OF THE INVENTION

This invention generally relates to illuminated aircraft warning markers mounted on power lines and suspended cables and, more particularly, to solar powered warning markers which are highly visible during daytime and nighttime environments both with the naked eye and with image intensification devices.

Aircraft warning devices are generally disclosed in U.S. Pat. Nos. 4,037,191; 4,405,926; 4,420,740; 4,839,567; 4,902,126 and 5,001,402. For example, U.S. Pat. No. 4,037,191 to Deane et al. and U.S. Pat. Nos. 4,839,567 and 5,001,402 to Milton et al. disclose aircraft warning markers which are illuminated by external power sources such as power lines.

Solar powered devices are generally disclosed in U.S. Pat. Nos. 4,648,013; 4,751,622; 4,763,126; 4,772,990; 4,884,017 and 4,989,124. For example, U.S. Pat. Nos. 4,751,622 and 4,884,017 to Williams disclose a solar powered construction light which is capable of operating in either a continuous or an intermittent mode. U.S. Pat. No. 4,772,990 to Lineham discloses a solar powered warning flasher which can be operated with both conventional and rechargeable batteries.

SUMMARY OF THE INVENTION

In accordance with the present invention, the illuminated warning marker assembly for suspended cables, power lines and the like includes a housing having solar cells and a plurality of flashing light elements connected to the housing. Mounting elements are attached to the housing for suspending the warning marker from the suspended cables and power lines.

For daytime conditions, the housing is colored to be readily visible to the naked eye and reflector elements may be secured to the housing to further enhance the visibility of the housing. For nighttime conditions, flashing light emitting elements are secured to the housing. The flashing light elements and the reflector elements are preferably disposed in adjacent relationship so that a portion of the light is reflected off an adjacently disposed reflector. The housing is preferably constructed of a plurality of flat panels which are connected together to form a polyhedral housing and the reflectors and light elements are connected to the flat surfaces of the panels.

A control circuit is connected to the solar panel and the light emitting elements for illuminating the light elements under predetermined conditions. The control circuit includes a power supply module for converting solar energy into stored electrical energy, a power supply voltage monitor module, a light level detector module and a logic control module which are integrated to turn the light elements on and off under predetermined conditions and to insure proper operation over a predetermined period of time. The light elements include both visible lighting devices and infrared emitting devices. The voltage of the stored electrical energy, in the form of rechargeable batteries, is continuously monitored.

The above brief description sets forth rather broadly the more important features of the present invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent construction insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved solar-powered aircraft warning device which is designed for both daytime and nighttime use and which may be readily installed on power lines, suspended cables and the like.

It is another object of the present invention to provide a new and improved solar-powered aircraft warning device which may be easily and efficiently manufactured and marketed.

It is a further objective of the present invention to provide a new and improved solar-powered aircraft warning device which is of durable and reliable construction.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 8 is a detailed schematic drawing of solar powered circuitry for illuminating the warning marker assembly.

DETAILED DESCRIPTION

Figure 1:
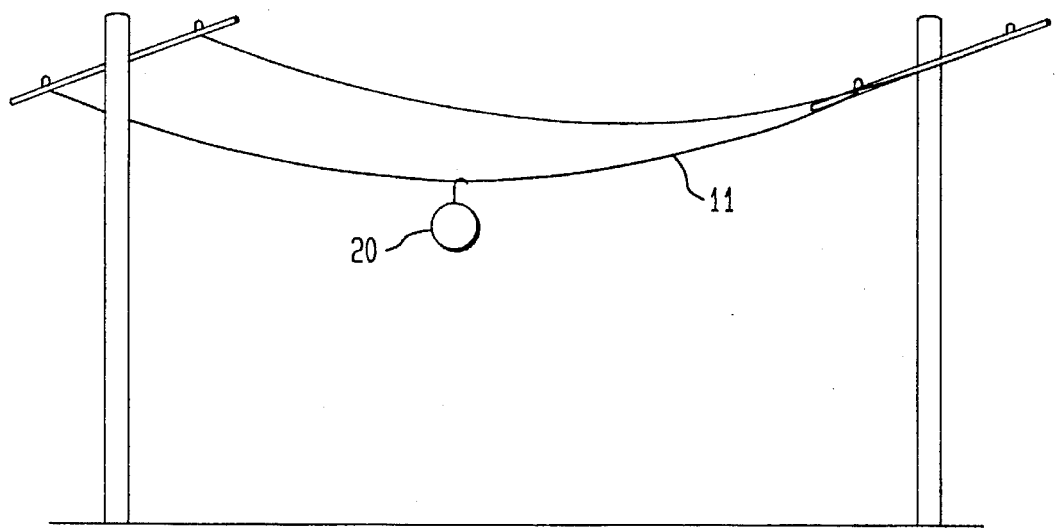
FIG. 1 is a perspective view of a warning marker assembly mounted on a suspended cable.

Referring to FIG. 1, there is generally shown a solar powered illuminated warning marker assembly 20 attached to a suspended cable 11 for providing a warning to aircraft and for providing flashing light emitting elements during nighttime and low light conditions. The light emitting elements may comprise both visible light devices, such as red light emitting devices (LED's), and infrared light devices, such as infrared LED's.

Figure 2:
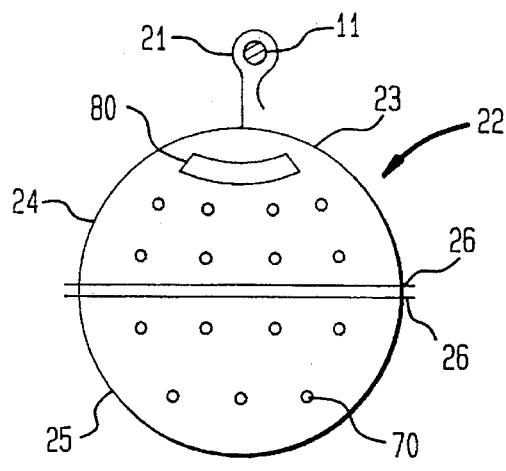
FIGS. 2 and 3 show various mounting devices for attaching the warning marker assembly to a suspended cable.
Figure 3:
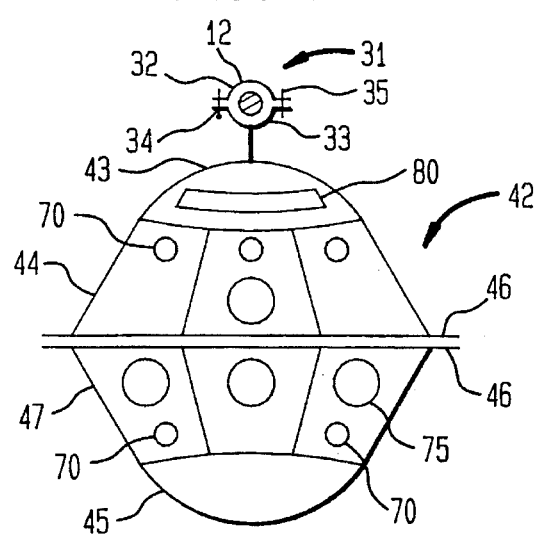

FIGS. 2 and 3 show different means for mounting warning marker assemblies on an elevated structure such as a suspended power line 11 or a strut element 12 of a tower. FIG. 2 shows a releasable hook 21 which can be readily snapped over a suspended cable 11. The flexible, releasable hook 21 is secured to the upper portion 23 of a generally spherical housing 22 having a plurality of lights 70, such as light emitting diodes (LED's), secured to the surface of the housing 22. One or more solar cells 80 may be secured to the outer surface of the spherical housing to provide power for the light elements. The housing 22 comprises two dome shaped halves 24, 25, which are secured together along common edge portions 26.

FIG. 3 shows a means for mounting a warning marker assembly on an elevated structure such as a strut 12 of a tower, in the form of an adjustable clamp 31. The clamp 31 comprises clamp elements 32 each having curved intermediate portions 33 and flange portions 34 for receiving fasteners 35. The lower clamp element 32 is secured to the upper portion 43 of a housing 42. The housing 42 comprises two multisided sections 44, 45 which are secured together along common edge portions 46. Each half is provided with a plurality of flat surface portions 47 that may have lights 70 and reflector elements 75 mounted thereon in spaced relationship.

Figure 4:
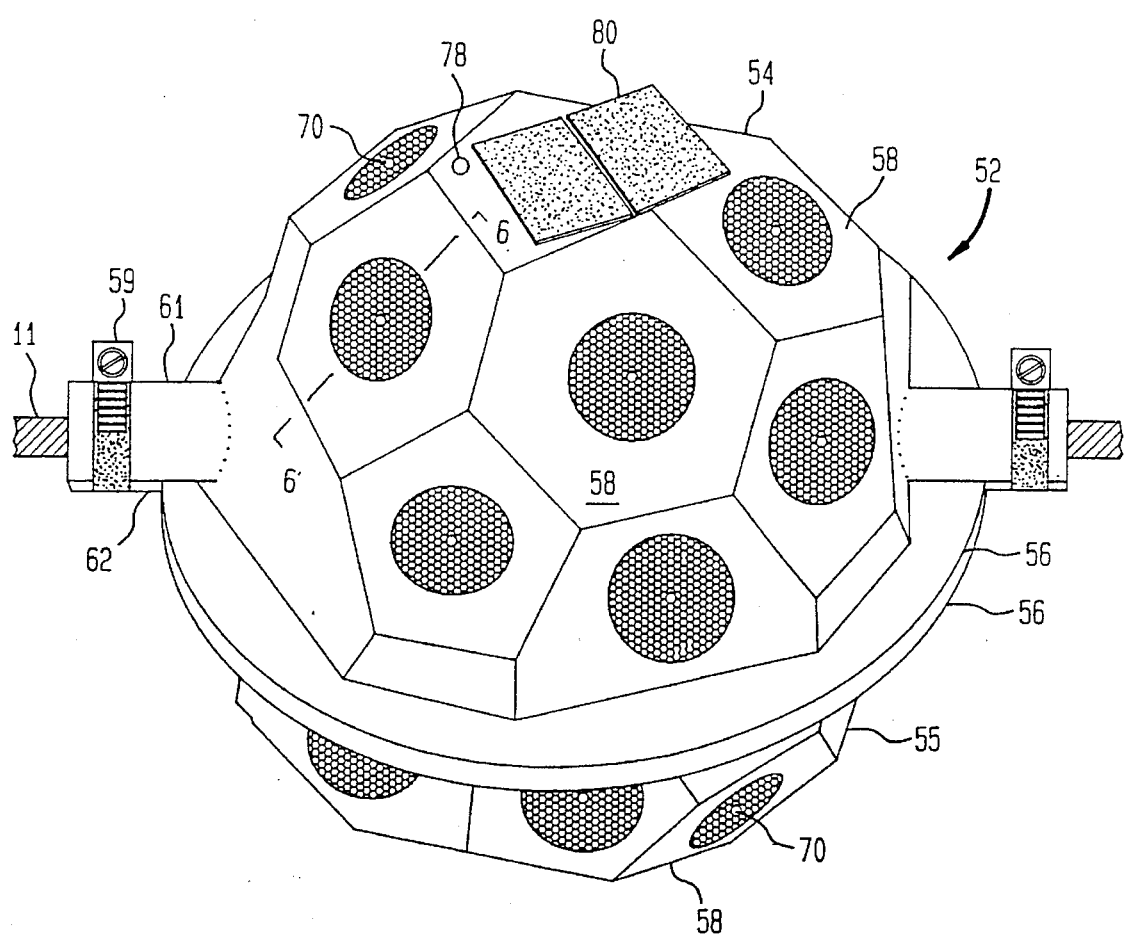
FIG. 4 is a perspective view of a preferred embodiment of the warning marker assembly.
Figure 5:
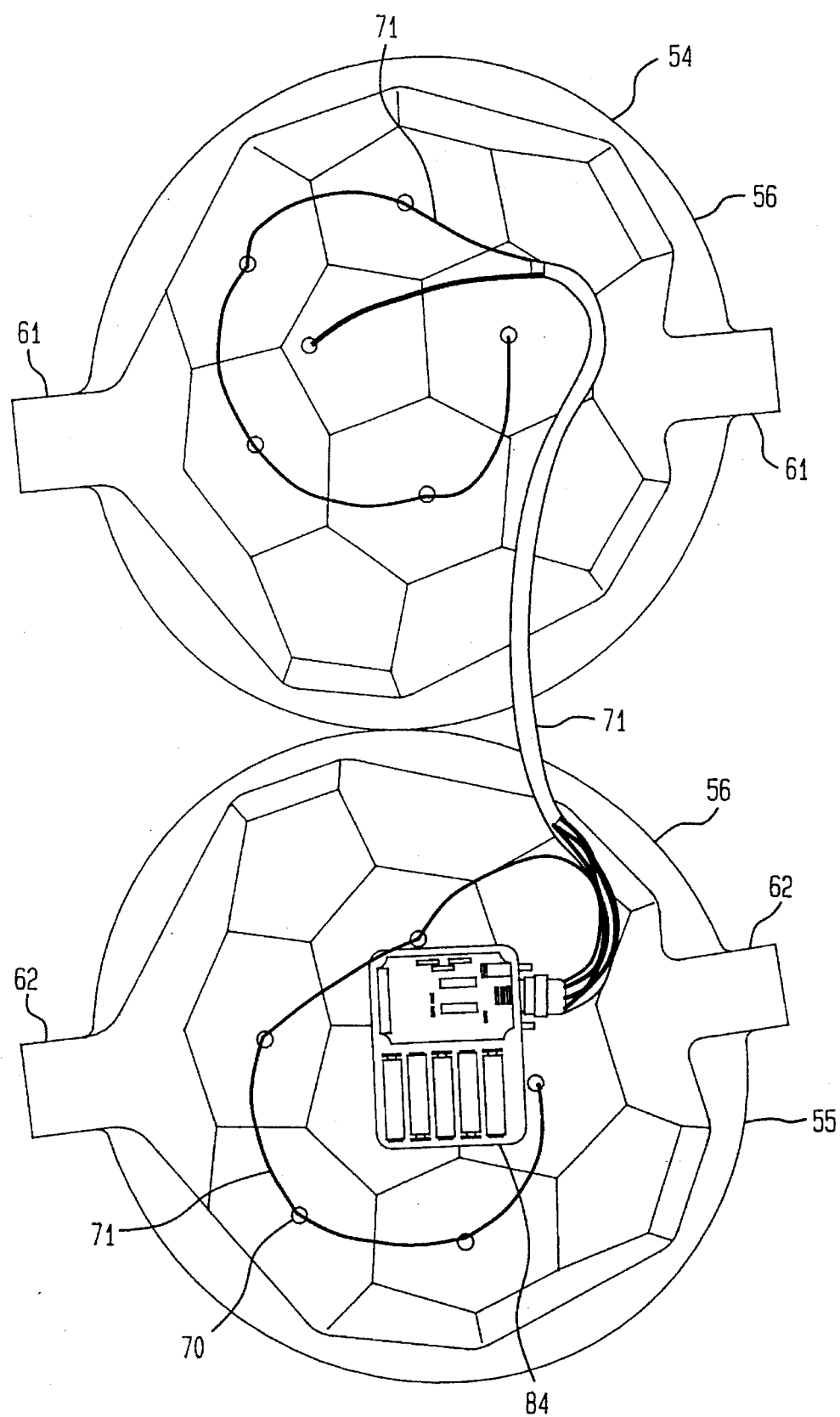
FIG. 5 is a broken apart interior view of the warning marker assembly.
Figure 6:
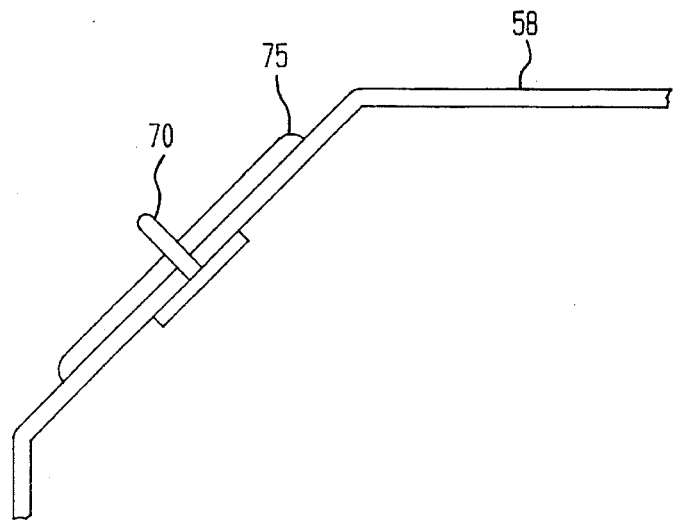
FIG. 6 is a partial sectional view of FIG. 4 taken generally along lines 6—6 showing internal components of the warning marker assembly.

As shown in FIG. 4, which depicts a top perspective view, and FIG. 5, which depicts an interior view of a preferred embodiment of the present invention, the warning marker assembly comprises a housing 52 having two semi-sphenical, polyhedral sections 54, 55 which are joined together along their common edge portions 56 and clamped to cable 11 with cable clamps 59. Each polyhedral section comprises a plurality of flat faces 58 which are joined together at their adjacent edge portions. The end portions 61, 62 of the polyhedral sections 54, 55 are of semi-cylindrical shape to facilitate clamping the end portions to the cable. At least some of the flat faces 58 are provided with light elements 70, preferably in the form of light emitting diodes, which are connected to the flat faces 58 and which extend through openings therein so that a major portion of the light elements project outward of the flat faces 58 as shown in FIG. 6. Reflector elements 75 in the form of multi-faceted planar discs, such as made by 3M Corporation, are secured to the outer surfaces of the flat faces 58 and surround the light elements 70 so that a portion of the light from the light elements 70 is reflected off the reflectors 75. More particularly, reflector elements manufactured by 3M Corporation under the trademarked brand name Scotchlite Reflective Sheeting would include, for example, High Intensity Grade series 5800 (adhesive), Diamond Grade series 3907G (traffic signs), or Engineer Grade series 3200 (adhesive). Solar cells 80 and a photoresistor 78 may be secured to the outer surface of the housings, as shown in FIG. 4. The housing 52 is preferably constructed of lightweight, weatherproof materials, such as fiberglass, plastics or aluminum alloy. The housing sections may be formed by a variety of molding techniques such as injection molding or stamping. To aid detection of the warning marker during the daytime, the warning marker preferably has a recognizable standard caution/warning color, such as red, yellow or international orange.

As shown in FIG. 5, the interior of the housing contains a battery powered internal power supply and electronic circuit board 84 and a wiring harness 71 for light elements 70. The battery powered internal power supply and electronic circuit board are connected to the lower section 55 of the housing 52 to provide weight stability when the housing is mounted on a support structure.

Figure 7:
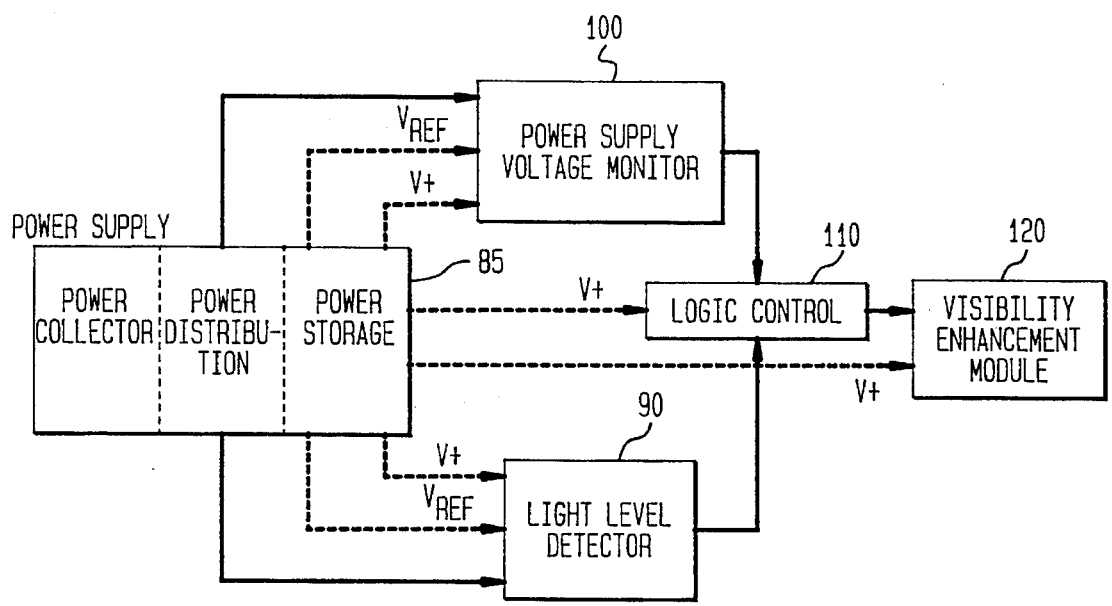
FIG. 7 is a block diagram of solar powered circuitry for illuminating the warning marker assembly.

The warning marker is intended to facilitate naked eye, daytime detection and electro-optical image intensification detection in nighttime/inclement weather through the use of a solar-powered visual detection scheme. The operation of the solar powered LED wire marker is generally depicted in a functional block diagram in FIG. 7. The functional blocks include a power supply 85 in the form of power collecting, power storage, and power distribution section; a light level detector circuit 90; a power supply voltage monitor circuit 100; a logic control circuit 110; and a visibility enhancement module 120.

The wire marker is designed to operate in two modes; a daytime mode and a nighttime/inclement weather or visual enhancement mode, with the light level detector circuit 90 utilized as the mode selector. As it becomes darker outside and the detected ambient light falls to a predetermined minimum threshold level for daytime operation, the light level detector circuit 90 sends an appropriate signal to the logic control circuit 110 to activate the light element or LED flasher circuit in the visibility enhancement module 120 as depicted in FIG. 8.

The visibility enhancement module 120 of the described preferred embodiment, includes LEDs or light elements 70 and a flasher circuit 121 designed to require an operating potential of 4.0 VDC to maintain normal operation. This voltage is provided by the power storage unit in the form of rechargeable NiCd batteries 81 which are charged by the power collecting unit in the form of solar cells 80. A characteristic of rechargeable NiCd batteries is a relatively uniform voltage output over the effective life of the battery. However, when power is depleted below a certain level, voltage output rapidly decreases to zero and it is often difficult to properly recharge the batteries. To prevent depletion of the batteries below the circuit operating potential, the battery output voltage is continually monitored. When the battery voltage drops below 4.0 VDC, the power to the flashing LEDs is interrupted to prevent further power depletion. Excessive depletion of the NiCd batteries, which could occur during periods of continuous overcast conditions, would seriously affect the recharging potential of the batteries. The power distribution section comprises the various electrical connections and wires for completing the electrical wiring of the device.

Referring again to FIG. 7 and as noted above, the power supply circuit 85 performs three functions: power collection, power storage, and power distribution. Power collection is achieved by solar cells 80 connected in series to provide 6 V DC at 100 mA to charge the power storage system in the form of four 1.2 VDC rechargeable NiCd batteries 81. Diode 82 prevents battery discharge back through the solar cells during nighttime operation. The power supply circuit 85 provides two functional voltages. The first voltage, V+, generated by the storage batteries 81, provides the positive operating voltage for the circuit components and signal voltages in the power supply voltage monitor circuit 100 and the light level detector circuit 90. The second voltage, V ref, is a reference voltage used as a signal input to comparators in the power supply voltage monitor circuit 100 and the light level detector circuit 90. V ref is supplied by a single separate 1.5 VDC alkaline battery 67 isolated by operational amplifier 68, which is configured as a voltage follower.

The light level detector circuit 90 consists of a voltage divider network containing a cadmium sulfide (CdS) photoconductive cell or photoresistor 78, an operational amplifier 91 configured as a comparator, and a NAND gate 92 used as a logic invertor. A voltage divider network, consisting of resistor 93, potentiometer 94, and the photoresistor 78, is used to establish a voltage level, at the input 95 of operational amplifier or op-amp 91, which may be designated a first operational amplifier and which determines the point at which the transition from daytime to nighttime mode is made. For daytime operation, light falling on the photoresistor 78 results in a low resistance value. This causes the voltage to input 95 of the op amp 91 to have a low-value. This low voltage at the inverting input 95 to op amp 91 is less than the voltage at the non-inverting input 96 of op amp 91. This latter voltage, V ref, is generated by the 1.5 volt battery 67 in the power supply. For these values, the output 97 of op amp 91 goes to its positive limit, $V^+$. This relatively high value is inverted by NAND gate 92 and becomes a low logic level output which is provided to input 113 of the logic control circuit 110. For nighttime operation, the photoresistor 78 takes on a relatively high resistance value. This causes the voltage input 95 to op amp 91 to have a relatively high voltage level as compared with V ref. This voltage at the inverting input 95 is greater than the voltage at input 96 of op amp 91. For these values, the output 97 goes to its negative limit. This low value is inverted by NAND gate 92 and becomes a high logic level which is provided to the logic control circuit 110. Potentiometer 94 is used to adjust the daytime/nighttime transition point.

The power supply voltage monitor circuit 100 consists of a voltage divider network and two op-amps configured as comparators. The voltage divider consists of resistor 101 and potentiometer 102 which are connected to V+, which normally is 4.8 VDC. The setting of potentiometer 102 determines the minimum value of residual battery voltage, such as 4.0 VDC, below which the flashing LEDs are disabled. The $V^+$ voltage is fed to operational amplifier 103, which is configured as a voltage follower, and applied to input 105 of operational amplifier 104, which may be designated as a second operational amplifier and which is configured as a comparator. The voltage at input 105 is compared to the reference voltage V ref, or 1.5 volts, which is applied at input 106 of operational amplifier 104. When the $V^+$ voltage exceeds 4.0 VDC, the output 107 normally exceeds 3 VDC and this logic level voltage is provided to the input 112 of the logic control circuit 110. When the battery voltage, $V^+$, drops below 4.0 VDC, the output 107 of the op amp 104 is normally less than 0.5 VDC.

The logic control circuit 110 consists of two NAND gates. Logic level outputs from the power supply voltage monitor and the light level detector are applied to inputs 112 and 113 of NAND gate 111 respectively. The output 114 of NAND gate 111 is applied to inputs 116 and 117 of NAND gate 115 which is configured as an invertor. NAND gates 111 and 115 operate together to provide an AND function of the two inputs 112, 113 to the logic control circuit. For example, as long as the $V^+$ voltage level is greater than 4.0 VDC, the output 118 of the logic control circuit is determined by the light level detector circuit output; a low logic level output for daytime and high logic level output for nighttime. If the $V^+$ voltage of the NiCd battery drops below 4.0 VDC, the resulting low input 112 at NAND gate 111 causes the output 118 of NAND gate 115 to have a relatively low value. Due to the NAND gate operation of the logic control circuit, its output 118 at NAND gate 115 is high only for the conditions of nighttime illumination and a $V^+$ voltage of greater than 4.0 VDC.

The visual enhancement module 120 in the form of an LED flasher circuit 121 and, as shown in FIG. 8, includes ten LEDs 70. The LED flasher circuit includes an emitter follower circuit 122, an RC timing circuit 126, and several biasing and current limiting resistors. The LEDs 70 are connected together in a parallel array which is in series with V+, the RC timing circuit, and the emitter follower 122, which operates as the on/off switch for the entire LED flasher circuit. The output 118 of the logic control circuit, applied through a resistor, controls the bias on the emitter follower 122. For nighttime conditions and when sufficient battery voltage is available, the resulting high level at the base of emitter follower 122 forward biases the emitter follower 122 and causes it to conduct. This applies a ground potential to the emitter 128 of the transistor and the base 127 of the transistor through resistor 129. This activates the flasher RC timing circuit 126. Transistor 127 is then biased on and off as determined by the RC time constant of resistor 130 and capacitor 131. The on and off biasing of transistor 127 controls the conduction of transistor 128 which, during a portion of the period of the RC timing cycle, applies the ground potential to the LEDs through resistor 132. The LEDS remain on during this period.

One example of a component configuration set forth below which was found to produce suitable illumination is set forth below:

| Component Drawing No. | Component |
| --- | --- |
| 131 | Capacitor, electrolytic, 4.7 uF, 35 V |
| 70 | Light emitting diode, CX556R |
| 82 | Diode, germanium, 1N34A, 75 V PIV |
| 127 | Transistor, 2N2907 |
| 128 | Transistor, 2N2222 |
| 122 | Transistor, ECH265, Darlington |
| 101 | Resistor, 100K ohms, ½ watt, 1% |
| 103 | Quad op amp (one fourth), LM324N |
| 92 | Quad NAND gate (one fourth), CD4011BE |
| 102 | Potentiometer, 100K ohms, 15 turn, ¾ watt |
| 67 | Battery alkaline, 1.5 VDC |
| 81 | Battery (4) NiCd, rechargeable, 1.2 VDC |
| 78 | CdS cell photoconductive cell (photoresistor), CL703L/2, dual element |
| 80 | Photovoltaic Cell (2) Solar cell, 3 VDC, 100 mA |

While the present invention has been shown in the drawings and fully described above with particularity and detail in connection with what is presently deemed to be the most practical and preferred embodiments of the invention, it will be apparent to those or ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. An illuminated, lightweight, self-powered aircraft warning marker for preventing collision of aircraft with suspended cables, comprising:

a generally hollow housing having an outer surface, the outer surface of the housing provided with a plurality of flat panel sections;

means connected to the housing for attaching the housing to the suspended cables;

solar cells mounted on the outer surface of the housing for converting solar energy into electrical energy;

a plurality of light elements attached to the flat panel sections of the housing, the light elements comprising light emitting diodes; and circuit means electrically connected to the solar cells and the light emitting diodes for periodically illuminating the light emitting diodes.

2. The invention according to claim 1, wherein the light emitting diodes comprise visible and infrared light emitting diodes.

3. The invention according to claim 1, further comprising light reflecting elements positioned on the flat panel sections of the housing generally adjacent to the light emitting diodes for reflecting light from the light emitting diodes.

4. The invention according to claim 1, wherein the housing is formed of two semi-spherical domes which are joined together along their respective edge portions.

5. An illuminated, lightweight, self-powered aircraft warning marker for preventing collision of aircraft with suspended structures, comprising:

a housing having an outer surface, the outer surface of the housing provided with a plurality of panel sections;

means connected to the housing for attaching the housing to suspended structures;

solar cells mounted on the outer surface of the housing for converting solar energy into electrical energy;

a plurality of light elements connected to the panel sections of the housing, the lights comprising light emitting diodes; and circuit means connected to the solar cells and the light emitting diodes for periodically illuminating the light emitting diodes, the circuit means comprising a power supply having a first electrical energy source in the form of a rechargeable battery for storing electrical energy produced by the solar cells and the rechargeable battery providing power which is distributed to the light emitting diodes as a first voltage ($V^+$), the power supply further having a second electrical energy source in the form of a battery device which provides a constant reference voltage (V ref), and the circuit means further comprising a power supply monitor connected to the first voltage ($V^+$) of the rechargeable battery and the reference voltage (V ref) of the battery device for terminating the flow of the first voltage ($V^+$) to the light emitting diodes when the first voltage ($V^+$) falls below the level of the reference voltage (V ref).

6. The invention according to claim 5, wherein the circuit means further includes a light level detector connected to the first voltage ($V^+$) of the power supply for allowing the first voltage ($V^+$) to be supplied to the light emitting diodes when the ambient light level falls below a predetermined level.

7. The invention according to claim 5, wherein the light emitting diodes consist of visible and infrared light emitting diodes which are electrically connected in parallel to the first voltage ($V^+$) and which are periodically illuminated.

8. An illuminated aircraft warning device for warning aircraft of the presence of suspended structures, comprising:

a housing having an outer surface;

means connected to the housing for attaching the housing to suspended structures;

solar cells mounted on the outer surface of the housing for converting solar energy into electrical energy;

a plurality of lights attached to the housing and electrically connected to the solar cells; and circuit means electrically connected to the solar cells and the lights for periodically illuminating the lights, the circuit means comprising:

a power supply having a first electrical energy source electrically connected to the solar cells in the form of a rechargeable battery for storing electrical energy produced by the solar cells and for distributing this electrical energy to the lights as a first voltage ($V^+$), the power supply further having a second electrical energy source in the form of a battery device which provides a constant reference voltage (V ref);

a power supply voltage monitor means electrically connected to the first voltage ($V^+$) of the rechargeable battery and the reference voltage (V ref) of the battery device for terminating the flow of the first voltage ($V^+$) to the lights when the first voltage ($V^+$) falls below the level of the reference voltage (V ref);

a light level detector means electrically connected to the power supply for supplying the first voltage ($V^+$) to the lights when the incident light level on the aircraft warning device falls below a predetermined level, the light level detector means including a voltage divider network consisting of a photocell which produces a voltage output which is a function of the amount of light received by the photocell and a potentiometer to which the first voltage ($V^+$) is applied, wherein the electrical outputs of the photocell and the potentiometer are applied to one input of a first operational amplifier and wherein the reference voltage (V ref) is applied to the other input of the first operational amplifier and wherein the first operational amplifier produces an output;

a logic control circuit electrically connected to the output of the first operational amplifier of the light level detector means and the power supply voltage monitor means for the illuminating the lights when the incident light on the photocell falls below a predetermined level and when the first voltage ($V^+$) is greater than the voltage level of the reference voltage (V ref); and a visual enhancement module electrically connected to the output of the logic control circuit and the first voltage ($V^+$) for producing periodic illumination of the light elements.

9. The invention according to claim 8, wherein the lights comprise visual and infrared light emitting diodes.

* * * * *